US010067859B2

(12) United States Patent
Gurfinkel et al.

(10) Patent No.: US 10,067,859 B2
(45) Date of Patent: *Sep. 4, 2018

(54) CONSTRUCTING TEST-CENTRIC MODEL OF APPLICATION

(71) Applicant: ENTIT SOFTWARE LLC, Sanford, NC (US)

(72) Inventors: Oren Gurfinkel, Yehud (IL); Oleg Verhovsky, Yehud (IL); Eliraz Busi, Yehud (IL); Maya Yohay Rafalovich, Yehud (IL); Malcolm Isaacs, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/486,047

(22) Filed: Apr. 12, 2017

(65) Prior Publication Data
US 2017/0220457 A1 Aug. 3, 2017

Related U.S. Application Data

(63) Continuation of application No. 14/397,213, filed as application No. PCT/US2012/049065 on Jul. 31, 2012, now Pat. No. 9,658,945.

(51) Int. Cl.
G06F 9/44 (2018.01)
G06F 11/36 (2006.01)
G06F 8/36 (2018.01)

(52) U.S. Cl.
CPC ............ G06F 11/3684 (2013.01); G06F 8/36 (2013.01); G06F 11/3608 (2013.01); G06F 11/3688 (2013.01)

(58) Field of Classification Search
CPC .................................................. G06F 11/3684
USPC .......................................................... 717/124
See application file for complete search history.

(56) References Cited

U.S. PATENT DOCUMENTS

| 6,006,028 | A | 12/1999 | Aharon et al. |
| 6,381,604 | B1 | 4/2002 | Caughran |
| 6,775,824 | B1 | 8/2004 | Osborne et al. |
| 6,934,934 | B1 | 8/2005 | Osborne et al. |
| 6,978,218 | B1 | 12/2005 | Kolb |
| 7,000,224 | B1 | 2/2006 | Osborne et al. |
| 7,058,534 | B1 | 6/2006 | Tracy et al. |
| 7,058,857 | B2 | 6/2006 | Dallin |

(Continued)

FOREIGN PATENT DOCUMENTS

IN 02239CH2011 7/2011

OTHER PUBLICATIONS

Elisabetta Di Nitto et al; A journey to highly dynamic, self-adaptive service-based applications; Autom Softw Eng (2008) 15: 313-341 DOI 10.1007/s10515-008-0032-x-30 Jul. 2008.

(Continued)

Primary Examiner — Francisco Aponte

(57) ABSTRACT

A test-centric model of an application is constructed. Each resource specified by each test governing an application is added to the test-centric model. The test or tests specifying an resource are linked to the resource within the test-centric model. A composition of the application is defined using the one or more tests, as the resources specified by the one or more tests, within the test-centric model of the application.

17 Claims, 3 Drawing Sheets

(56) References Cited

U.S. PATENT DOCUMENTS

| | | | |
|---|---|---|---|
| 7,171,588 B2 | 1/2007 | Friedman et al. | |
| 7,356,436 B2 | 4/2008 | Bohizic | |
| 7,421,621 B1 | 9/2008 | Zambrana | |
| 7,581,212 B2 | 8/2009 | West et al. | |
| 7,610,578 B1* | 10/2009 | Taillefer | G06F 11/3664 717/124 |
| 7,631,227 B2 | 12/2009 | Poisson et al. | |
| 7,725,496 B2 | 5/2010 | Paval | |
| 7,752,499 B2 | 7/2010 | Choudhury et al. | |
| 7,934,127 B2 | 4/2011 | Kelso | |
| 7,937,622 B2* | 5/2011 | Mehrotra | G06F 11/3684 714/25 |
| 8,145,450 B2 | 3/2012 | Brown et al. | |
| 8,151,276 B2 | 4/2012 | Grechanik | |
| 8,296,603 B2 | 10/2012 | Matsumoto | |
| 8,296,734 B2* | 10/2012 | Geppert | G06F 11/3692 717/101 |
| 8,423,962 B2 | 4/2013 | Becker et al. | |
| 8,458,662 B2 | 6/2013 | Grechanik | |
| 8,473,928 B2 | 6/2013 | Park | |
| 8,639,983 B1 | 1/2014 | Desai | |
| 8,719,789 B2 | 5/2014 | Adler | |
| 8,788,652 B2 | 7/2014 | Ramanath | |
| 8,868,981 B2 | 10/2014 | Glaser | |
| 8,893,138 B2 | 11/2014 | Arnold | |
| 8,904,239 B2 | 12/2014 | Seren | |
| 8,914,676 B2 | 12/2014 | Cao | |
| 8,966,454 B1 | 2/2015 | Michelsen et al. | |
| 8,984,487 B2 | 3/2015 | Houck et al. | |
| 8,984,490 B1 | 3/2015 | Dahan | |
| 9,009,668 B2 | 4/2015 | Pasternak | |
| 9,098,633 B2 | 8/2015 | Kianovski | |
| 9,235,490 B2 | 1/2016 | Dahan | |
| 2004/0143819 A1 | 7/2004 | Cheng et al. | |
| 2005/0010895 A1 | 1/2005 | Reddappagari | |
| 2005/0172269 A1 | 8/2005 | Johnson | |
| 2005/0193258 A1 | 9/2005 | Sutton | |
| 2005/0204201 A1 | 9/2005 | Meenakshisundaram et al. | |
| 2006/0070035 A1 | 3/2006 | Ulrich | |
| 2007/0240118 A1 | 10/2007 | Keren | |
| 2008/0127101 A1* | 5/2008 | Anafi | G06F 11/3664 717/125 |
| 2008/0222454 A1* | 9/2008 | Kelso | G06F 11/3684 714/38.14 |
| 2008/0229149 A1 | 9/2008 | Penton | |
| 2008/0270992 A1 | 10/2008 | Georgieva et al. | |
| 2008/0270998 A1* | 10/2008 | Zambrana | G06F 11/3612 717/131 |
| 2008/0276224 A1 | 11/2008 | Gyure et al. | |
| 2009/0217302 A1 | 8/2009 | Grechanik | |
| 2009/0307763 A1 | 12/2009 | Rawlins | |
| 2010/0107136 A1 | 4/2010 | Fildebrandt et al. | |
| 2010/0306772 A1 | 12/2010 | Arnold et al. | |
| 2011/0016452 A1 | 1/2011 | Gorthi | |
| 2011/0258600 A1* | 10/2011 | Osenkov | G06F 11/3664 717/124 |
| 2011/0296382 A1 | 12/2011 | Pasternak | |
| 2012/0151448 A1 | 6/2012 | Becker et al. | |
| 2012/0174074 A1 | 7/2012 | Ganai | |
| 2012/0233505 A1 | 9/2012 | Acharya et al. | |
| 2013/0054792 A1 | 2/2013 | Sharaf | |
| 2013/0305224 A1 | 11/2013 | Eade et al. | |
| 2014/0045597 A1 | 2/2014 | Fernandez et al. | |
| 2015/0100684 A1 | 4/2015 | Maes | |
| 2015/0199197 A1 | 7/2015 | Maes | |

OTHER PUBLICATIONS

Korean Intellectual Property Office, International Search Report, dated Feb. 18, 2013, 10 pages, Daejeon Metropolitan City, Republic of Korea.

Qing Xie and Atif M. ; Model-Based Testing of Community-Driven Open-Source GUI Applications—Memon, Department of Computer Science—University of Maryland, College Park, MD 20742—22nd IEEE International Conference on Software Maintenance (ICSM'06)—2006 IEEE.

Yu Huang and Qihong Shao; Testing the Scalability of Saas Applications—,School of Computing, Informatics, and Decision Systems Engineering, Arizona State University; Wei-Tek Tsai—Department of Computer Science and Technology, Tsinghua University, Beijing, China-Service-Oriented Computing and Applications (SOGA), 2011 IEEE International Conference.

Kosindrdecha, N, et al., A Test Case Generation Process and Technique, Feb. 1, 2011, 16 pages http://scialert.net/fulltext/?doi=jse.2010.265.287&org=10.

Supplementary European Search Report, Dec. 2, 2015, European Patent Application No. 12882316.8, 10 pages.

* cited by examiner

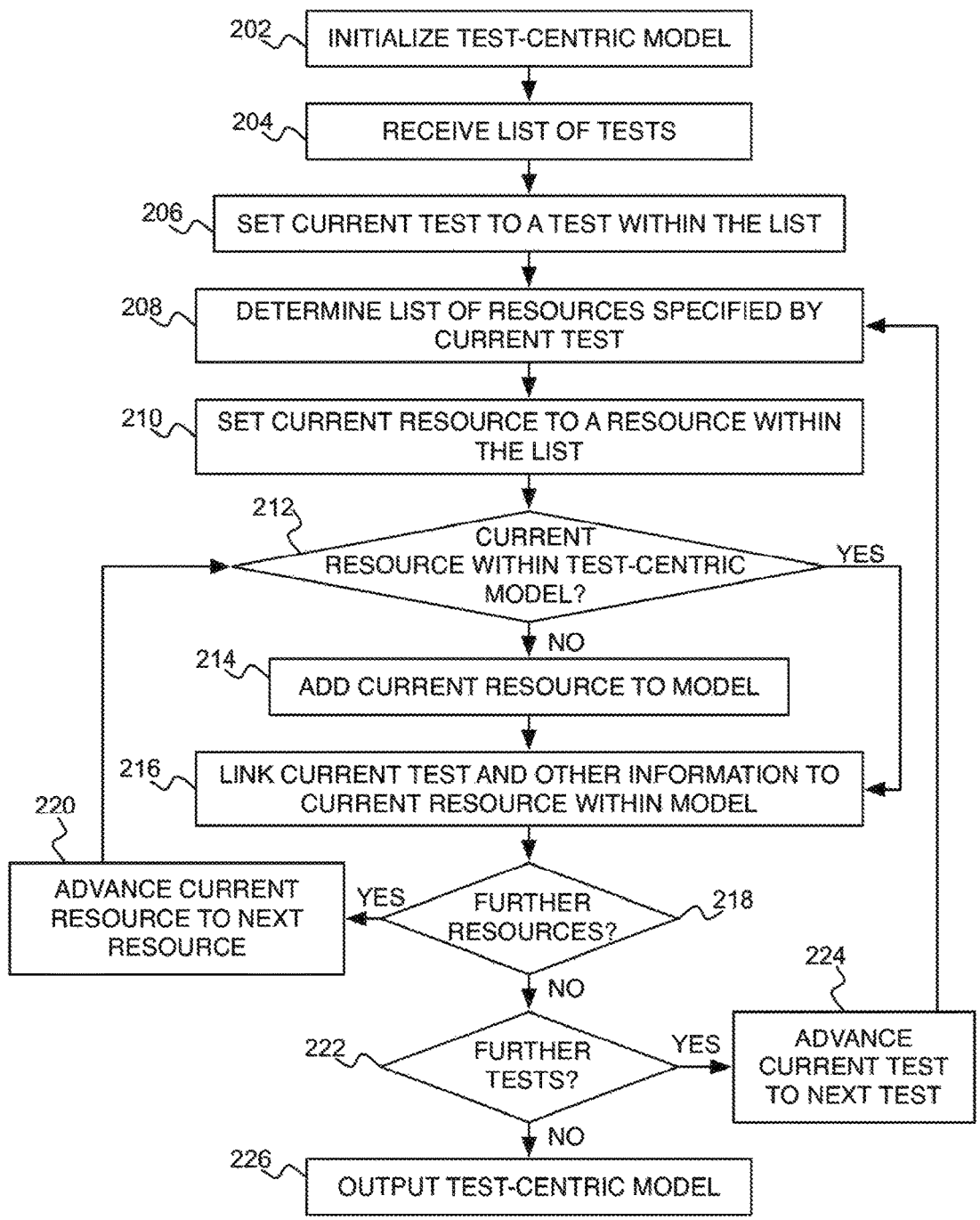

CONSTRUCTING TEST-CENTRIC MODEL OF APPLICATION

CLAIM FOR PRIORITY

The present application is a Continuation of commonly assigned and co-pending U.S. patent application Ser. No. 14/397,213, filed Oct. 27, 2014, which is a national stage filing under 35 U.S.C. § 371 of PCT application number PCT/US2012/049065, having an international filing date of Jul. 31, 2012, the disclosures of which are hereby incorporated by reference in their entireties.

BACKGROUND

A composite application is a software application that is constructed by combining multiple existing functions into a new application. A composite application can use business sources, such as existing software components or modules, as well as information services, including business services and/or Internet web services. Such services may be provided in the context of a service-oriented architecture (SOA) for instance. Services expose application programming interfaces (APIs), which are also referred to as contracts, and which define how consumers—i.e., applications—can interact with the services. A composite application can incorporate the orchestration of its various constituent parts via internal logic that dictates how the functionality provided by these parts interact to generate new, derived functionality. By using existing services, components, and modules, a developer thus may be able to develop a composite application in less time than coding an application from scratch. Development and testing of a composite application is typically performed against the resources that the services provide, such as their contracts (e.g., APIs).

BRIEF DESCRIPTION OF THE DRAWINGS

FIG. 2 is a flowchart of an example method for identifying the constituent resources of a composite application.

DETAILED DESCRIPTION

As noted in the background section, a composite application is constructed by combining multiple existing functions, which may be provided by services and other components, into a new application. An underlying challenge of especially complex composite applications is understanding the constituent parts of a composite application. The underlying services and components of the composite application may change over time, and may be modified by different developers, making it difficult without conducting extensive and time-consuming manual analysis exactly what services and components make up the composite application.

Techniques disclosed herein leverage heretofore unrelated testing of such an application to determine the application's constituent resources. A composite application can be referred to as an application under test (AUT), which is an application that is subjected to a battery of tests to ensure that the application is performing correctly. Each test is predefined, and tests one or more separate underlying services or components of an application. Such tests typically interact with the underlying services, and do so through the contracts that the services expose. A contract is considered a resource of the test. Thus, during development of a composite application, as well as afterwards, the application is subjected to selected tests to ensure and verify that the application operates properly.

The techniques disclosed herein leverage such existing tests to use them advantageously for a heretofore different purpose for which the tests were not intended: determining a test-centric model of an application to identify its services from its constituent resources. Each resource specified by each of a number of selected tests is added to a test-centric model, such as, for example, as a node of a graph. The test or tests specifying a given resource are linked to the resource within the model. As such, the application's composition is defined using the tests in question. A developer can thus use predefined tests' resources to determine the actual current services constituting an application.

Within the test-centric model of an application, various other information can further be linked to the resources contained within the model. Requirements of each test pertaining to an resource can be linked to the resource within the model. Detected defects of a resource can likewise be linked to the resource within the test-centric model. As such, besides providing for a way to identify the composition of an application precisely, the techniques disclosed herein also provide a way by which a developer or tester can enrich information regarding the application, such as the requirements of its underlying resources and any found defects within those resources.

Figure 1:
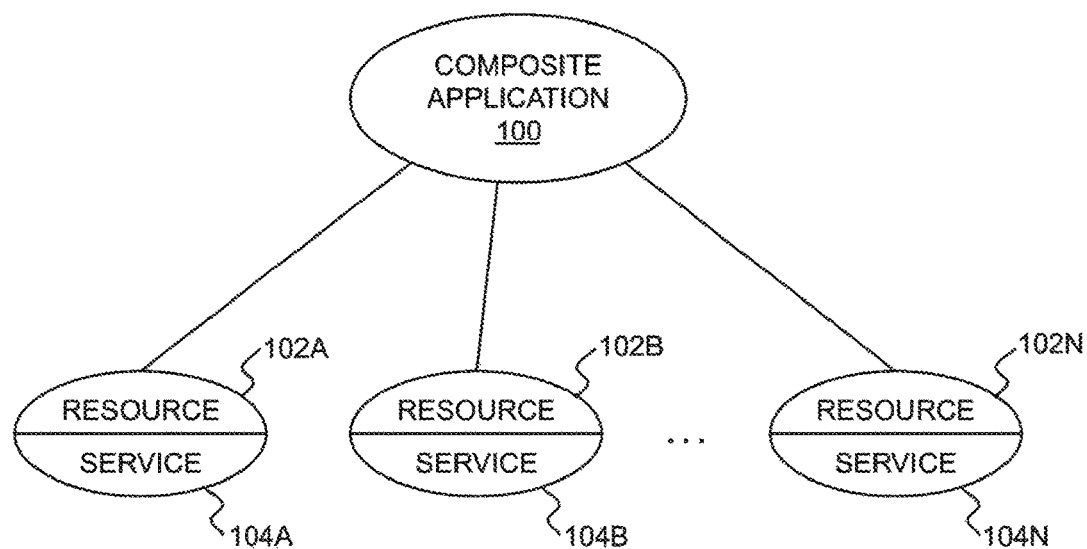
FIG. 1 is a diagram of an example composite application that can have its constituent resources identified in conjunction with the techniques disclosed herein.

FIG. 1 shows an example composite application 100. As noted above, a composite application 100 is software that is constructed by using the functionality of existing services, components, modules, or other types of software parts. The composite application 100 can include internal logic that ties together such various functionality to provide a new, derived functionality.

As such, the composite application 100 is made up of services 104A, 104B, . . . , 104N, which are collectively referred to as the services 104. The services 104 expose contracts, which are referred to as resources 102A, 102B, . . . , 102N, and which are collectively referred to as the resources 102. Each resource 102 is a contract belonging to a different service, component, module, or other type of software part, each of which is generically encompassed under the term terminology "service" herein. In a given composite application 100, there can be tens, hundreds, or even more of such resources 102. As noted above, maintaining the identities of such constituent resources 102 can be a time-consuming manual exercise, and can be error prone.

FIG. 2 shows an example method 200 for identifying the resources 102 of the composite application 100 using tests that are ordinarily used on the application 100 as an AUT. Prior to performance of the method 200, the composition of the application 100—i.e., its constituent resources 102—may not be fully a priori known. The method 200 may be implemented as a computer program executable by a processor of a computing device, like a desktop or laptop computer or other type of computing device. The computer program may be stored on a tangible computer-readable data storage medium, such as a magnetic medium, a semiconductor medium, or another type of medium.

The method 200 initializes a test-centric model of the composite application 100 (202). For instance, the test-centric model may be initialized to be an empty model containing no resources 102. The test-centric model will ultimately define a composition of the application 100 via its constituent resources 102 as identified by tests. As such, a list of tests that may ordinarily be used to test the composite application 100 is received (204). For instance, a user may select one or more such tests. It can therefore be said that the identification of such tests is received.

The completeness of the composition of the application 100 as defined by the test-centric model may be as complete as the list of tests and the resources used by the tests in the list. However, in general, a complete battery of such tests is typically maintained to test each different functionality of the composite application 100. Each such test may stress a different resource 102 or group of resources 102 of the composite application 100.

What is referred to as the current test is set to any arbitrary test within the list of tests (206), such as the first test within the list. A list of resources 102 specified by the current test is determined or identified (208). This can be achieved by querying the current test, for instance. It is noted that determining the list of resources 102 does not involve running the current test. That is, actually using the test for its intended purpose—testing one or more resources 102 of the composite application 100—is not performed or achieved. However, each test delineates the services or other resources 102 that the test uses.

To query the current test, one of three different techniques may be employed. First, an interface of the current test may be queried, where the interface is particular to the method 200 or the computer program performing the method 200. As such, the test is a priori constructed to be compatible with the method 200. That is, the test is designed to ensure that it has an interface that is compatible with the manner by which the method 200 performs queries of tests.

Second, an interface of the current test may be queried, but where the interface is particular to the test, and it is the method 200 or the computer program performing the method 200 that is a priori constructed to be compatible with the test. That is, the method 200 is designed to ensure that it is able to query the interface of the current test. The difference between the former technique and the latter technique is, therefore, that in the former technique the test is designed in contemplation of the method 200, whereas in the latter technique the method 200 is designed in contemplation of the test.

Third, the method 200 or the computer program performing the method 200 may not query the current test directly, as in the prior two techniques, but rather query middleware that interfaces the method 200 with the test. In this technique, the middleware directly queries the test on behalf of the method 200. The method 200 can thus be designed to just query the middleware, and the middleware updated as appropriate to ensure compatibility with any new interfaces of tests that are developed.

It is noted that the resources 102 may be identified in different ways by different tests, and different tests may specify or reference the same resources 102. For example, one test may identify an resource 102 via a universal resource locator (URL) alphanumeric address, whereas another test may identify the same resource via an Internet protocol (IP) numeric address. However, in general, each resource 102 has some type of generally unique identifier (GUID) by which the method 200 is able to track whether different tests are referring to the same or difference resource 102. In another implementation, other techniques may be employed, though, to verify that apparently different resources 102 are indeed different resources 102.

What is referred to as a current resource is set to any arbitrary resource 102 within the list of resources 102 for the current test (210), such as the first resource 102 within the list. If the current resource is not within the test-centric model (212), then the current resource is added to the model (214). For example, the test-centric model may be represented as a graph that is initialized in part 202 as having a root node corresponding to the composite application 100 and/or the tests that are specified in part 204 (where part 204 is performed prior to part 202). As such, the current resource is added to the test-centric model by adding a vertex or node representing the current resource to the graph, and adding an edge between this node and the root node. It is noted that in other implementations, a root node corresponding to the composite application as a whole may not be present, such that the current resources are added as representative nodes independently to the graph, and a user can define the relationships among the nodes afterwards.

The current test, as well as other information in some implementations, is linked to the current resource within the test-centric model (216). As such, each resource 102 represented within the model has one or more tests linked thereto, which are the tests that specify this resource 102. The other information can include requirements of the current test and/or of the composite application 100 as these requirements pertain to the current resource, defects of the current resource based on the last or any prior running of the current test in relation to the application 100, and so on. Adding such information to the test-centric model renders the model more information rich, and thus permits a user to glean a fuller view of the composite application 100 in addition to its constituent resources 100 during examination of the model.

If there are further resources 102 within the list of resources 102 for the current test that have not yet been processed (218), then the current resource is advanced to another resource 102 within this list that has not yet been processed (220), and the method 200 is repeated at part 212 in relation to the new current resource. Otherwise, processing of the current test is complete. If there are further tests within the list of tests that have not yet been processed (222), then the current test is advanced to another test within this list that has not yet been processed (224), and the method 200 is repeated at part 208 in relation to the new current test. Otherwise, processing of the tests is complete.

The test-centric model is output (226). The test-centric model, as noted above, defines a composition of the composite application 100 via the tests, and thus specifies the constituent resources 102 of the application 100 that are referenced by or specified within the tests. Output of the test-centric model may be static or dynamic. In a static sense, the model can be output by printing a graphical representation of the model, such as of the graph and its nodes that have been described. In a dynamic sense, the model can be output by displaying such a graphical representation on an electronic or other display device such as a computer monitor or screen, and permitting a user to interact with this display to view individual resources 102 in more detail, such as the various information that was linked thereto.

Figure 3:
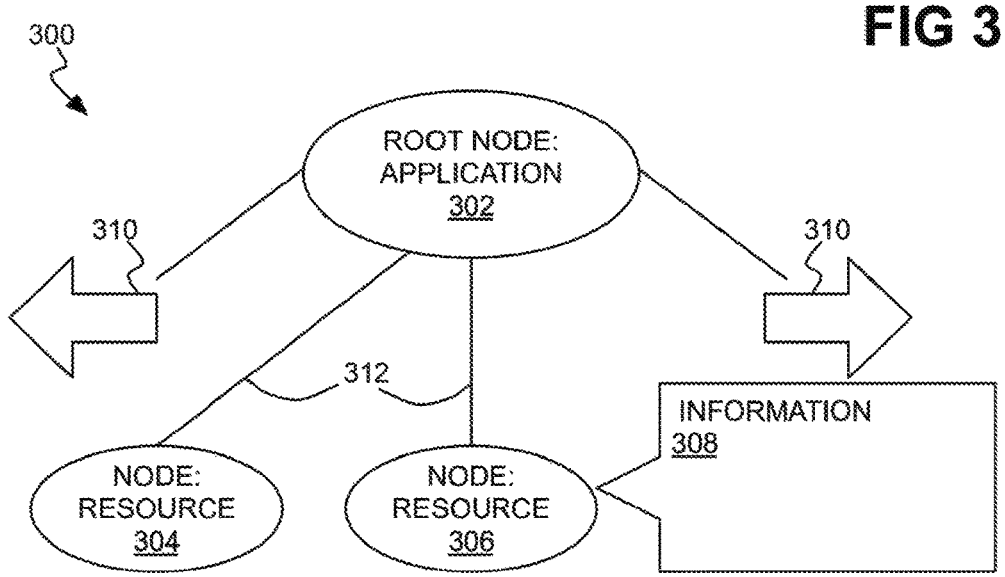
FIG. 3 is a diagram of an example graph that can be constructed using the example method of FIG. 2.

FIG. 3 shows an example graph 300 of a test-centric model, which may be generated via the method 200. The graph 300 includes a root node 302 and children nodes, such as children nodes 304 and 306 that are linked to the root node 302 via edges 312. The root node 302 represents the composite application 100 or at least the tests that have been processed to define the composition of the application 100. The nodes 304 and 306, among other children nodes of the graph 300 not depicted in FIG. 3, each represent an resource 102 of the composite application 100 as discovered using the method 200.

FIG. 3 in particular shows a dynamic output of the graph 300. A user is able to click or select arrows 310 to bring different children nodes of the root node 302 into view, where in FIG. 3 two particular children nodes 304 and 306 are currently displayed. A user is also able to click or select any child node to call up the information regarding the corresponding resource 102 that the method 200 determined in part 216. In the example of FIG. 3, the child node 306 has been selected. As such, a bubble 308 of this information regarding the resource 102 to which the child node 306 corresponds is being displayed for the user's review.

Other types of output of the graph 300 and of the test-centric model itself can be achieved in other implementations, as noted above. For example, a graphical representation of the test-centric model, as a graph and its nodes, may be displayed in one window. In other selectable windows, the information gathered for each resource 102 in part 216 of the method 200 may be displayed. In such an implementation, a user can thus select among the windows to view an overview of the test-centric model as a whole, as well as to drill down into the model to view details regarding each resource 102 contained within the model.

Figure 4:
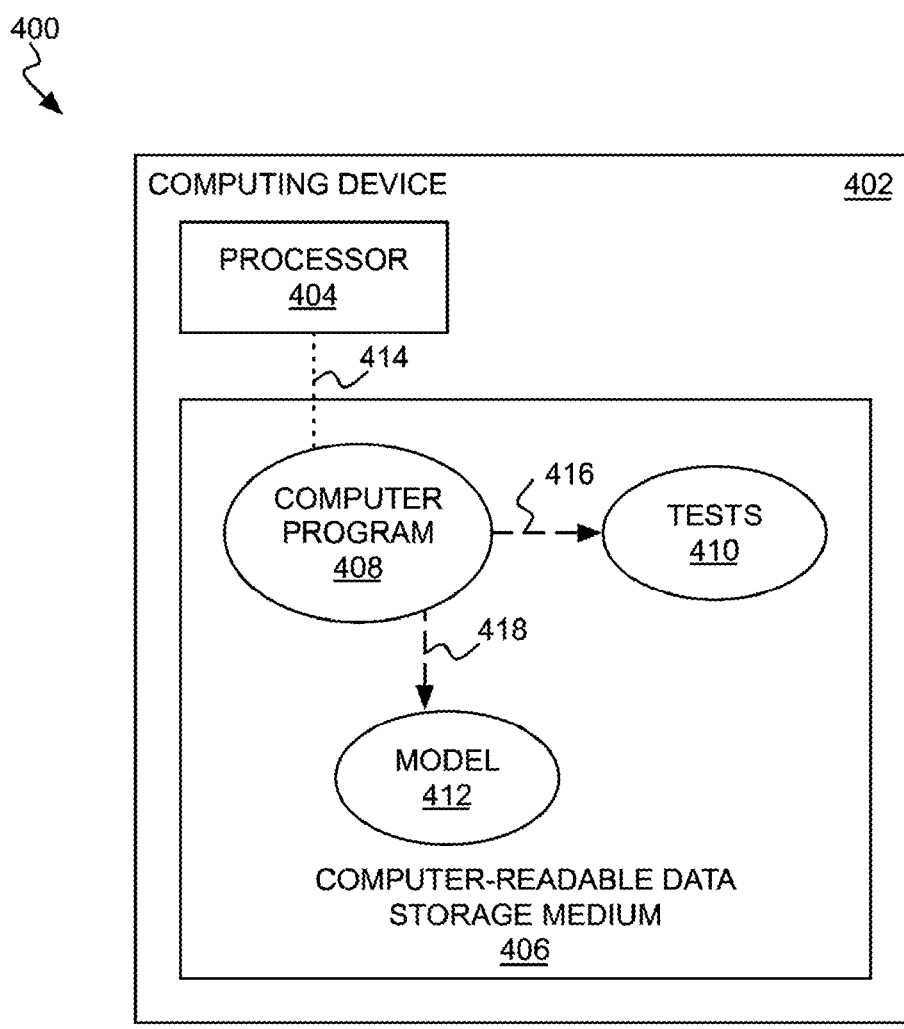
FIG. 4 is a diagram of an example computing system for identifying the constituent resources of a composite application.

FIG. 4 shows an example system 400 for identifying the resources 102 of the composite application 100. The system 400 in one implementation is implemented as a computing device 402, such as a desktop or a laptop computer. However, in other implementations, the system 400 can be implemented over multiple such computing devices, which may be in communication with one another via a network, for instance.

The computing device 402 includes a processor 404 and a computer-readable data storage medium 406. The computer-readable data storage medium 406 can store data representing one or more tests 410, data representing a test-centric model 412, and a computer program 408. The computer-readable data storage medium 406, and may be a magnetic medium, a semiconductor medium, a volatile medium, a non-volatile medium, and so on.

The processor 404 executes the computer program 408 from the computer-readable data storage medium 408, as indicated by the dotted line 414 between the computer program 408 and the processor 404. Execution of the computer program 408 by the processor 404 causes performance of a method, such as the method 200. As such, the computer program 408 processes one or more tests 410, as indicated by the dotted line 416, to construct the test-centric model 412, as indicated by the dotted line 418. By generating the test-centric model 412, therefore, the computer program 408 identifies the resources 102 of the composite application 100 as has been described.

We claim:

1. A method comprising:
   determining, by a processor of a computing device, a list of resources specified by a test selected from a list of tests, the list of tests including tests to be used to test an application;
   for each resource in the list of resources that is not within a test-centric model of the application, adding the respective resource to the test-centric model of the application, including
   adding a child node representing the respective resource to a graph representing the test-centric model, wherein the child node includes information regarding the respective resource, and
   adding an edge between the child node and a root node representing the application;
   constructing, by the processor, a composition of the application using at least the respective resource within the test-centric model; and
   after the respective resource is added to the test-centric model, linking the selected test to the respective resource within the test-centric model.

2. The method of claim 1, wherein linking the selected test to the respective resource within the test-centric model includes:
   linking requirements of the selected test related to the respective resource to the respective resource within the test-centric model.

3. The method of claim 1, further comprising:
   linking detected defects of the respective resource to the respective resource within the test-centric model.

4. The method of claim 1, wherein determining the list of resources specified by the selected test includes querying the selected test without running the selected test on the application.

5. The method of claim 1, further comprising:
   sequentially selecting a next test in the list of tests; and
   for each of the next tests in the list of tests, determining a list of resources specified by the next test, adding any resources in the list that are not within the test-centric model of the application to the test-centric model, and linking the resources added to the test-centric model to the next test.

6. The method of claim 1, wherein the composition of the application becomes known only after the construction of the composition based on at least the respective resource within the test-centric model.

7. A non-transitory computer readable medium storing instructions that when executed by a processor of a computing device cause the processor to:
   determine a list of resources specified by a test selected from a list of tests, the list of tests including tests to be used to test an application;
   for each resource in the list of resources that is not within a test-centric model of the application, add the respective resource to the test-centric model of the application; and
   construct a composition of the application using at least the respective resource within the test-centric model,
   wherein to add the respective resource to the test-centric model, the instructions are to cause the processor to:
   add a child node representing the respective resource to a graph representing the test-centric model, the child node including information regarding the respective resource, and
   add an edge between the child node and a root node representing the application, and
   wherein the instructions are to cause the processor to:
   after the respective resource is added to the test-centric model, link the selected test to the respective resource within the test-centric model.

8. The non-transitory computer readable medium of claim 7, wherein to link the selected test to the respective resource within the test-centric model, the instructions are to cause the processor to:

link requirements of the selected test related to the respective resource to the respective resource within the test-centric model.

9. The non-transitory computer readable medium of claim 7, wherein the instructions are to cause the processor to:
link detected defects of the respective resource to the respective resource within the test-centric model.

10. The non-transitory computer readable medium of claim 7, wherein to determine the list of resources specified by the selected test, the instructions are to cause the processor to:
query the selected test without running the selected test on the application.

11. The non-transitory computer readable medium of claim 7, wherein the instructions are to cause the processor to:
sequentially select a next test in the list of tests; and
for each of the next tests in the list of tests, determine a list of resources specified by the next test, add any resources in the list that are not within the test-centric model of the application to the test-centric model, and link the resources added to the test-centric model to the next test.

12. The non-transitory computer readable medium of claim 7, wherein the composition of the application becomes known only after the construction of the composition based on at least the respective resource within the test-centric model.

13. A computing device comprising:
a processor; and
a non-transitory computer readable medium storing instructions that when executed by the processor cause the processor to:
determine a list of resources specified by a test selected from a list of tests, the list of tests including tests to be used to test an application;
for each resource in the list of resources that is not within a test-centric model of the application, add the respective resource to the test-centric model of the application; and
construct a composition of the application using at least the respective resource within the test-centric model,
wherein to add the respective resource to the test-centric model, the instructions are to cause the processor to:
add a child node representing the respective resource to a graph representing the test-centric model, the child node including information regarding the respective resource, and
add an edge between the child node and a root node representing the application, and
wherein the instructions are to cause the processor to:
after the respective resource is added to the test-centric model, link the selected test to the respective resource within the test-centric model.

14. The computing device of claim 13, wherein to link the selected test to the respective resource within the test-centric model, the instructions are to cause the processor to:
link requirements of the selected test related to the respective resource to the respective resource within the test-centric model.

15. The computing device of claim 13, wherein the instructions are to cause the processor to:
link detected defects of the respective resource to the respective resource within the test-centric model.

16. The computing device of claim 13, wherein to determine the list of resources specified by the selected test, the instructions are to cause the processor to:
query the selected test without running the selected test on the application.

17. The computing device of claim 13, wherein the instructions are to cause the processor to:
sequentially select a next test in the list of tests; and
for each of the next tests in the list of tests, determine a list of resources specified by the next test, add any resources in the list that are not within the test-centric model of the application to the test-centric model, and link the resources added to the test-centric model to the next test.

* * * * *